United States Patent
John et al.

(10) Patent No.: US 7,916,138 B2
(45) Date of Patent: Mar. 29, 2011

(54) ELECTRO-OPTIC VISION SYSTEMS

(75) Inventors: Ellenby John, San Francisco, CA (US); Thomas William Ellenby, San Francisco, CA (US); Peter Malcolm Ellenby, San Francisco, CA (US); Kenyon E. B. McGuire, Ramona, CA (US)

(73) Assignee: GeoVector Corporation, San Francisco, CA (US)

( * ) Notice: Subject to any disclaimer, the term of this patent is extended or adjusted under 35 U.S.C. 154(b) by 0 days.

(21) Appl. No.: 11/945,000

(22) Filed: Nov. 26, 2007

(65) Prior Publication Data

US 2008/0068400 A1 Mar. 20, 2008

Related U.S. Application Data

(63) Continuation of application No. 09/571,394, filed on May 15, 2000, now Pat. No. 7,301,536, which is a continuation-in-part of application No. 08/691,784, filed on Aug. 2, 1996, now Pat. No. 6,064,398, and a continuation-in-part of application No. 08/571,096, filed on Dec. 12, 1995, now abandoned, and a continuation-in-part of application No. 08/482,943, filed on Jun. 7, 1995, now abandoned, and a continuation-in-part of application No. 08/480,689, filed on Jun. 7, 1995, now abandoned, and a continuation-in-part of application No. 08/441,299, filed on May 15, 1995, now Pat. No. 5,530,102, and a continuation-in-part of application No. 08/335,710, filed on Nov. 10, 1994, now Pat. No. 5,619,078, and a continuation-in-part of application No. 08/335,940, filed on Nov. 8, 1994, now Pat. No. 5,625,765, and a continuation-in-part of application No. 08/335,912, filed on Nov. 8, 1994, now Pat. No. 5,682,332, and a continuation-in-part of application No. 08/307,360, filed on Sep. 14, 1994, now Pat. No. 5,742,521, and a continuation-in-part of application No. 08/119,360, filed on Sep. 10, 1993, now Pat. No. 5,815,411.

(51) Int. Cl.
*G06T 15/00* (2006.01)

(52) U.S. Cl. ........ 345/419; 345/629; 345/630; 345/156; 702/150; 702/185

(58) Field of Classification Search .................. 345/419, 345/629, 630, 156; 702/150, 185; 707/10
See application file for complete search history.

(56) References Cited

U.S. PATENT DOCUMENTS

| 4,600,200 | A | * | 7/1986 | Oka et al. ........................ 463/33 |
| 5,625,765 | A | * | 4/1997 | Ellenby et al. ................ 345/633 |
| 5,696,892 | A | * | 12/1997 | Redmann et al. ............. 345/582 |
| 5,717,414 | A | * | 2/1998 | Bergsneider et al. ............ 345/8 |
| 6,037,936 | A | * | 3/2000 | Ellenby et al. ................ 715/764 |
| 6,094,625 | A | * | 7/2000 | Ralston ........................ 702/150 |

(Continued)

OTHER PUBLICATIONS

S. Feiner, et al., "Knowledge-based Augmented reality", Comm ACM, vol. 36, No. 7, pp. 53-62, Jul. 1993.*

*Primary Examiner* — Phu Nguyen
(74) *Attorney, Agent, or Firm* — Ward & Olivo LLP

(57) ABSTRACT

An image processing system for delivering real scene information to a data processor. The system includes the data processor, an image-delivery mechanism, an information delivery mechanism, and a graphic processor.

18 Claims, 2 Drawing Sheets

U.S. PATENT DOCUMENTS

| | | | |
|---|---|---|---|
| 6,278,461 B1 * | 8/2001 | Ellenby et al. | 345/427 |
| 6,396,475 B1 * | 5/2002 | Ellenby et al. | 345/156 |
| 6,397,556 B1 * | 6/2002 | Karpinia | 52/748.1 |
| 6,414,696 B1 * | 7/2002 | Ellenby et al. | 715/762 |
| 7,031,875 B2 * | 4/2006 | Ellenby et al. | 702/150 |
| 7,138,963 B2 * | 11/2006 | Hobgood et al. | 345/8 |
| 7,190,392 B1 * | 3/2007 | Maguire, Jr. | 348/121 |

* cited by examiner

ELECTRO-OPTIC VISION SYSTEMS

CROSS-REFERENCES TO RELATED PATENT APPLICATIONS

This application is a continuation of application Ser. No. 09/571,394 filed May 15, 2000 which will issue as U.S. Pat. No. 7,301,536 on Nov. 27, 2007 which is a continuation-in-part of the following patent applications: Ser. No. 08/691,784, filed Aug. 2, 1996 now U.S. Pat. No. 6,064,398; Ser. No. 08/119,360, filed Sep. 10, 1993 now U.S. Pat. No. 5,815,411; Ser. No. 08/307,360, filed Sep. 14, 1994 now U.S. Pat. No. 5,742,521; Ser. No. 08/335,912, filed Nov. 8, 1994 now U.S. Pat. No. 5,682,332; Ser. No. 08/335,940, filed Nov. 8, 1994 now U.S. Pat. No. 5,625,765; Ser. No. 08/335,710, filed Nov. 10, 1994 now U.S. Pat. No. 5,619,078; Ser. No. 08/441,299, filed May 15, 1995 now U.S. Pat. No. 5,530,102; Ser. No. 08/480,689, filed Jun. 7, 1995 now abandoned; Ser. No. 08/482,943, filed Jun. 7, 1995 now abandoned; and Ser. No. 08/571,096, filed Dec. 12, 1995 now abandoned.

FIELD OF THE INVENTION

The present invention is generally related to electronic vision devices and methods, and is specifically related to image augmentation in combination with navigation, position, and attitude devices.

BACKGROUND OF THE INVENTION

One may have to look quite far into the annals of history to find the first uses of maps. Maps generally provide information to alert a user to things that are not readily apparent from simple viewing of a real scene from the users location. For example, a user of a city road map may not be able to see a tunnel on Elm Street if the user is currently seven miles away on First Street and looking in the direction of the Elm Street tunnel. However, from the First Street location, the user could determine from a road map that there is a tunnel on Elm Street. He could learn that the tunnel is three miles long, starts on Eighth Street and ends on Eleventh Street. There may even be an indication of the size of the tunnel such that it could accommodate four traffic lanes and a bicycle lane.

Unfortunately, it is not always possible to translate the information from a map to the real scene that the information represents as the scene is actually viewed. It is common for users of maps to attempt to align the map to reality to get a better "feel" of where things are in relation to the real world. Those who are familiar with maps can verify that the fact that maps are drawn with north being generally in the direction of the top of the map, is of little use when translating the information to the scene of interest. Regardless of where north is, one tends to turn the map so that the direction ahead of the user, or in the direction of travel, in a real scene matches that direction on the map. This may result in the condition of an "upside down" map that is quite difficult to read (the case when the user is traveling south). Although translating the directions of the map to reality is a formidable task, it is an even greater problem to translate the symbols on the map to those objects in reality which they represent. The tunnel symbol on the map does not show what the real tunnel actually looks like. The fact that the appearance of the tunnel from infinitely many points of view is prohibitively difficult to represent on a map accounts for the use of a simple symbol. Furthermore, the map does not have any indication from which point of view the user will first see the tunnel, nor any indication of the path which the user will take to approach the tunnel.

It is now possible to computerize city road map information and display the maps according to the path taken by a user. The map is updated in "real-time" according to the progress of the user through the city streets. It is therefore possible to relieve the problem of upside-down maps as the computer could re-draw the map with the text in correct orientation relative to the user even when one is traveling in a southerly direction. The computer generated map is displayed at a monitor that can be easily refreshed with new information as the user progresses along his journey. Maps of this type for automobiles are well known in the art. Even very sophisticated maps with computer generated indicia to assist the user in decision making are available and described in patents such as DeJong U.S. Pat. No. 5,115,398. This device can display a local scene as it may appear and superimpose onto the scene, symbolic information that suggests an action to be taken by the user. Even in these advanced systems, a high level of translation is required of the user. The computer generated map does not attempt to present an accurate alignment of displayed images to the real object which they represent.

Devices employing image supplementation are known and include Head Up Displays (HUDs) and Helmet Mounted Displays (HMDs). A HUD is a useful vision system which allows a user to view a real scene, usually through an optical image combiner such as a holographic mirror or a dichroic beamsplitter, and have superimposed thereon, navigational information for example symbols of real or imaginary objects, vehicle speed and altitude data, et cetera. It is a primary goal of the HUD to maximize the time that the user is looking into the scene of interest. For a fighter pilot, looking at a display device located nearby on an instrument panel, and changing the focus of ones' eyes to read that device, and to return to the scene of interest, requires a critically long time and could cause a fatal error. A HUD allows a fighter pilot to maintain continuous concentration on a scene at optical infinity while reading instruments that appear to the eye to also be located at optical infinity and thereby eliminating the need to refocus ones' eyes. A HUD allows a pilot to maintain a "head-up" position at all times. For the airline industry, HUDs have been used to land airplanes in low visibility conditions. HUDs are particularly useful in a landing situation where the boundaries of a runway are obscured in the pilots field of view by fog but artificial boundaries can be projected onto the optical combiner of the HUD system to show where in the user's vision field the real runway boundaries are. The virtual runway projection is positioned in the vision field according to data generated by communication between a computer with and the airport instrument landing system (ILS) which employs a VHF radio beam. The system provides the computer with two data figures. First a glide slope figure, and second, a localizer which is a lateral position figure. With these data, the computer is able to generate an optical image (photon) to be projected and combined with the real scene (photon) that passes through the combiner and thereby enhancing certain features of the real scene; for example runway boundaries. The positioning of the overlay depends on the accuracy of the airplane boresight being in alignment with the ILS beam and other physical limitations. The computer is not able to recognize images in the real scene and does not attempt to manipulate the real scene except for highlighting parts thereof. HUDs are particularly characterized in that they are an optical combination of two photon scenes. The combination being a first scene, one that is normally viewed by the users eyes passes through an optical combiner, and a second, computer generated photon image which is combined with the real image at an optical element. In a HUD device it is not possible for the computer to address objects of the real scene, for example to alter or delete them. The system only adds enhancement to a feature of the real image by drawing interesting features thereon. Finally, HUDs are very bulky and are typically mounted into an airplane or automobile and require a great deal of space and complex optics including holograms and specially designed lenses.

HMDs are similar to HUDs in that they also combine enhancement images with real scene photon images but they typically have very portable components. Micro CRTs and small combiners make the entire system helmet mountable. It is a complicated matter to align computer generated images to a real scene in relation to a fast moving helmet. HUDs can align the data generated image that is indexed to the slow moving airplane axis which moves slowly in relation to a runway. For this reason, HMDs generally display data that does not change with the pilots head movements such as altitude and airspeed. HMDs suffer the same limitation as the HUDs in that they do not provide the capacity to remove or augment elements of the real image.

Another related concept that has resulted in a rapidly developing field of computer assisted vision systems is known as virtual reality (VR). Probably best embodied in the fictional television program "Star Trek; The Next Generation", the "Holodeck" is a place where a user can go to have all of his surroundings generated by a computer so as to appear to the user to be another place or another place and time.

Virtual reality systems are useful in particular for a training means. For example in aircraft simulation devices. A student pilot can be surrounded by a virtual "cockpit" which is essentially a computer interface whereby the user "feels" the environment that may be present in a real aircraft, in a very real way and perhaps enhanced with computer generated sounds, images and even mechanical stimuli. Actions taken by the user may be interpreted by the computer and the computer can respond to those actions to control the stimuli that surround the user. VR machines can create an entire visual scene and there is no effort to superimpose a computer generated scene onto a real scene. A VR device generally does not have any communication between its actual location in reality and the stimuli being presented to the user. The location of the VR machine and the location of the scene being generated generally have no physical relationship.

VR systems can be used to visualize things that do not yet exist. For example, a home can be completely modeled with a computer so that a potential buyer can "walk-through" before it is even built. The buyer could enter the VR atmosphere and proceed through computer generated images and stimuli that accurately represent what a home would be like once it is built. In this way, one could know if a particular style of home is likable before the large cost of building the home is incurred. The VR machine being entirely programmed with information from a designer does not anticipate things that presently exist and there is no communication between the elements presented in the VR system to those elements existing in reality.

While the systems and inventions of the prior art are designed to achieve particular goals, features, advantages, and objectives, some of those being no less than remarkable, these systems and inventions have limitations and faults that prevent their use in ways that are only possible by way of the present invention. The prior art systems and inventions can not be used to realize the advantages and objectives of the present invention.

SUMMARY OF THE INVENTION

The present invention involves a vision system including devices and methods of augmented reality wherein an image of some real scene is altered by a computer processor to include information from a data base having stored information of that scene in a storage location that is identified by the real time position and attitude of the vision system.

One embodiment of the present invention comprises an image processing system used in an electro-optic apparatus having an image capturing means, position determining means, attitude determining means, database of real scene information, and a display means. The image capturing means generating a digital image representing an object. The image processing system comprises a data processor and a graphic processor generating an image to be displayed by the display means based on data generated by the data processor. The image processing system further comprises means for delivering the digital image to the data processor and means for identifying information related to the digital image from the database information. The related information is delivered to the data processor. The data processor combining and processing the digital image and the related information. As a result, a user of the electro-optic apparatus can see an augmented image These and other features of the present invention will become apparent from the following description when read in conjunction with the drawings and the appended claims.

DETAILED DESCRIPTION OF THE INVENTION

The present invention comprises a novel electro-optic system and associated image processing devices. The following description is presented to enable any person skilled in the art to make and use the invention. Descriptions of specific applications are provided only as examples. Various modifications to the preferred embodiments will be readily apparent to those skilled in the art, and the general principles defined herein may be applied to other embodiments and applications without departing from the spirit and scope of the invention. Thus, the present invention is not intended to be limited to the embodiments shown, but is to be accorded the widest scope consistent with the principles and features disclosed herein.

Figure 1:
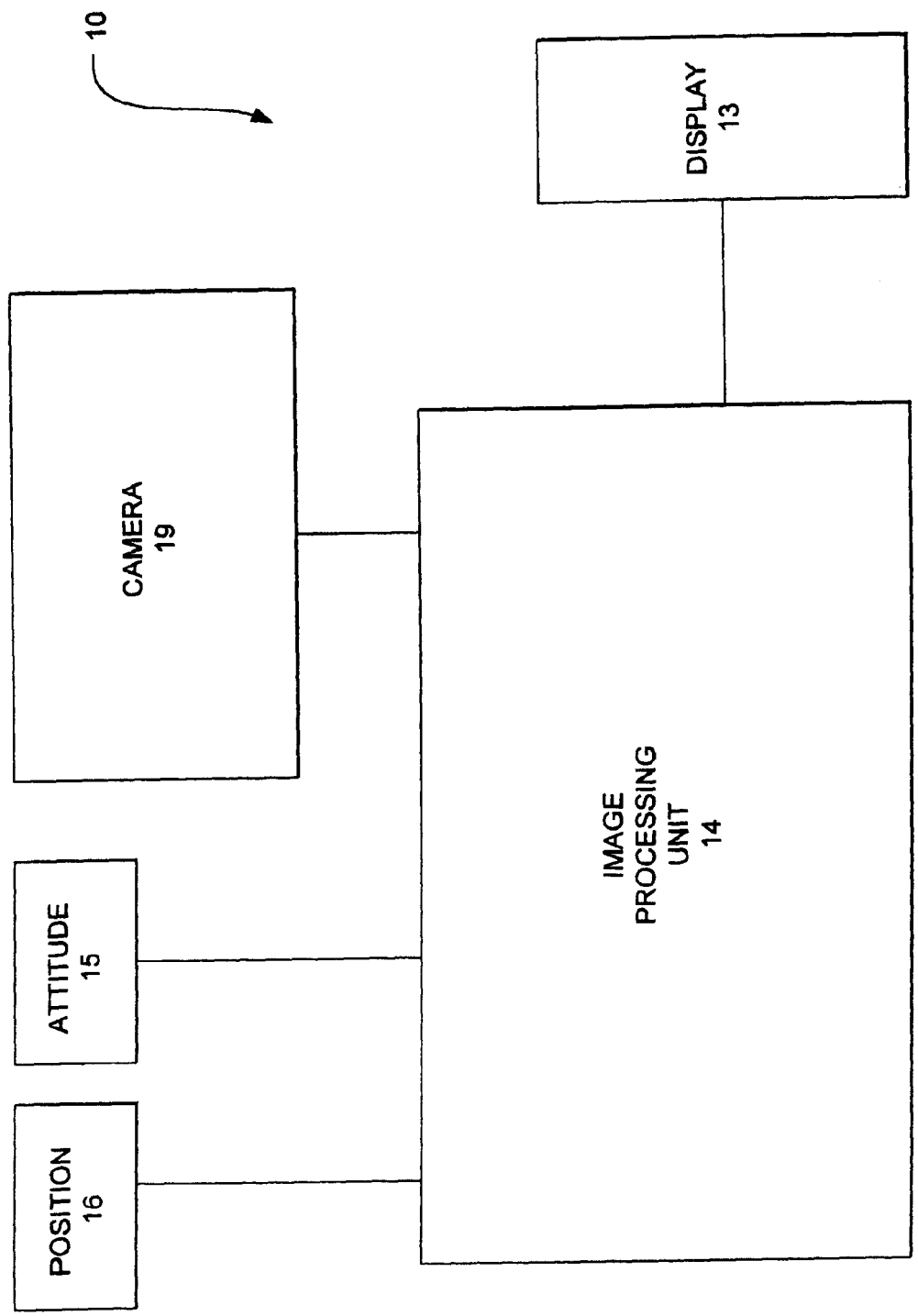
FIG. 1 is a block diagram of an electro-optic system of the present invention.

FIG. 1 is a block diagram of an electro-optic system 10 of the present invention. System 10 comprises a position determining means 16, an attitude determining means 15, a camera 19, an image processing unit 14, and a display 13. Camera 19 comprises an electro-optic device capable of converting a photon input (from a field of view) into an electronic image. Camera 19 then transmits the electronic image to image processing unit 14. Position determining means 16 determines the position of the camera and transmit the information to image processing unit 14. Similarly, attitude determining means determines the camera pointing attitude of the camera defined by, e.g., the symmetry axis of the camera field of view. Attitude determining means 15 transmits the attitude information to image processing unit 14. Image processing unit 14 analyzes and processes inputs from position determining means 16, attitude determining means 15, and camera 19 so as to generate real and augmented images. These images are then transmitted to display 13 for use by the user. Various applications and advantages of electro-optic system 10 have been disclosed in the following copending patent applications: Ser. No. 08/119,360, entitled "An Electro-Optic Vision System Which Exploits Position and Attitude" and filed Sep. 10, 1993; Ser. No. 08/307,360, entitled "Vision System For Viewing A Sporting Event" and filed Sep. 14, 1994; Ser. No. 08/335,912, entitled "Vision Imaging Devices and Methods Exploiting Position And Attitude" and filed Nov. 8, 1994; Ser. No. 08/335,940, entitled "Vision Imaging Devices And Methods Having An Unlimited Zoom Range" and filed Nov. 8, 1994; Ser. No. 08/335,710, entitled "Computer Games Having Optically Acquired Images Which Are Combined With Computer Generated Graphics And Images" and filed Dec. 4, 1994; Ser. No. 08/441,299, entitled "Augmented Reality Vision Systems Which Derive Image Information From Other Vision Systems" and filed Mar. 27, 1995; Ser. No. 08/480,689, entitled "Vision Systems For Viewing Objects That Identify Themselves" and filed Jun. 7, 1995; Ser. No. 08/482,943, entitled "An Electro-Optic Vision System Which Exploits Position And Altitude" and filed Jun. 7, 1995; Ser. No. 08/482,944, entitled "Vision System Computer Modeling Apparatus" and filed Jun. 7, 1995; Ser. No. 08/571,096, entitled "Computer Vision System Which Determines Identify, Position and Orientation Of Objects In A Scene And Displays Augmented Images Thereof" and filed Dec. 12, 1995. These patent applications are incorporated herein by reference.

It should be appreciated that electro-optic system 10 of FIG. 1 may contains additional components. For example, it may be desirable to include a set of user inputs so that an user can enter data to image processing unit 14. Other measuring devices, such as temperature gauge, accelerometer, range finder, etc., can also be coupled to image processing unit 14.

Figure 2:
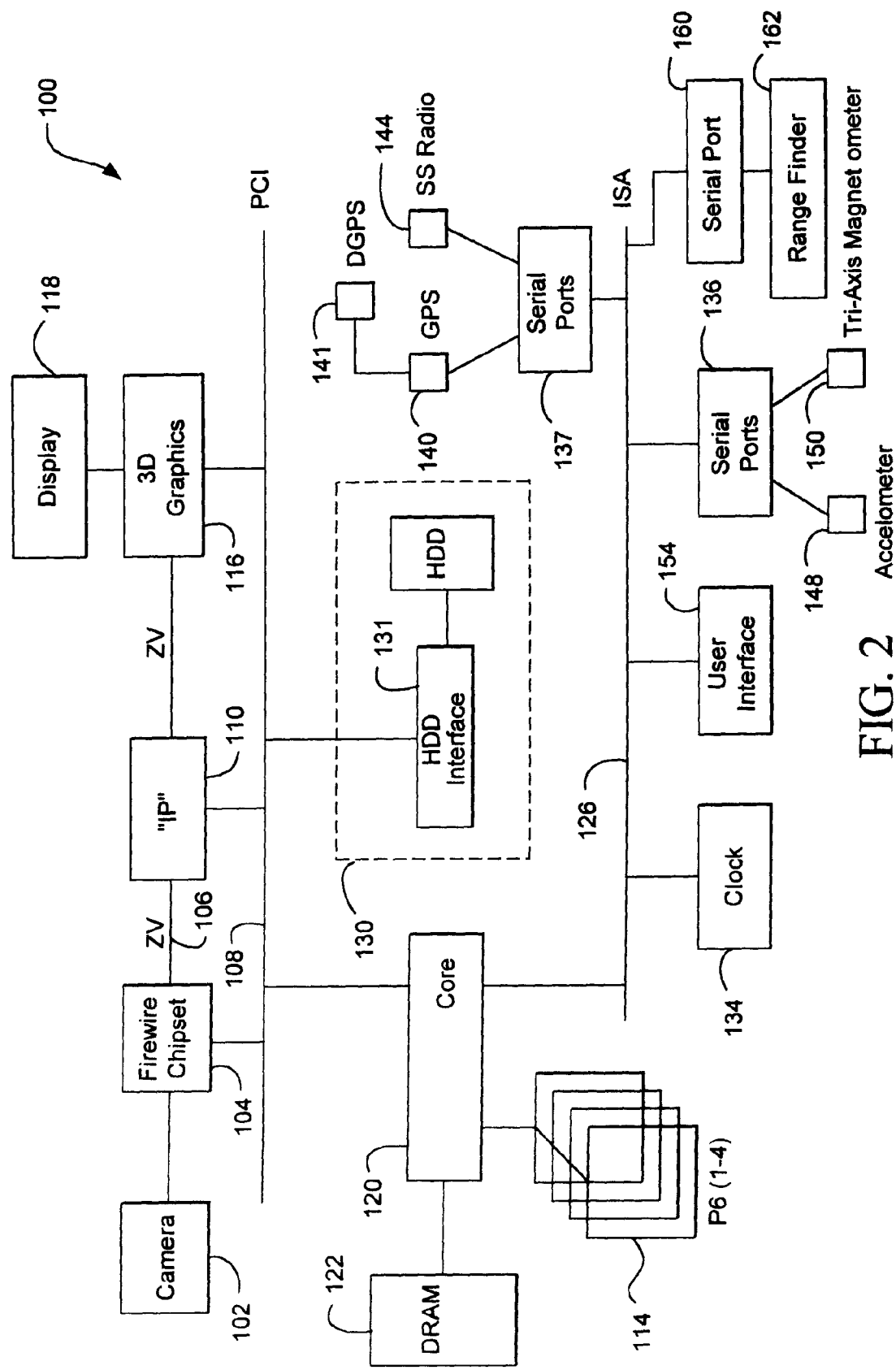
FIG. 2 is a block diagram showing an image processing system of the present invention used in the electro-optic system of FIG. 1.

FIG. 2 is a block diagram of an embodiment of an electro-optic system 100 showing the detail structure of its image processing unit.

System 100 comprises a video input device, such as a camera 102, which accepts optical image information and generates a corresponding digital video in the form of IEEE 1394 (FireWire) data. Camera 102 can optionally generate information relating to iris, exposure time. zoom (image magnification) ratio and stabilizer data (e.g., 1, 2, or 3 axis acceleration). FireWire is a high speed serial interface bus specification especially tuned for transferring digital video information at rates of up to 400 Megabits per second (Mbits/second). This interface has been implemented in Sony Corporation's Digital HandyCam series of camcorders. An exemplary camera contains one or more charged coupled device (CCD) area imaging sensors. It produces information which is digitized and encoded to an industry standard video format. This data is then transmitted serially at up to 400 Mbits/second via the FireWire data bus. Control and configuration information can be passed bi-directionally over this bus as well.

It should be noted that although IEEE 1394 is the presently preferred digital interface for video data, the invention could be implemented using other digital interfaces, now available or to be developed in the future.

The output of camera 102 is connected to a FireWire video interface chipset 104. This chipset accepts the IEEE 1394 data from camera 102 and generates command and data in a Zoom Video bus 106 and a Peripheral Component Interconnect (PCI) bus 108. Zoom Video (or Zoomed Video) is an interface standard used by Personal Computer Manufacturing Card Industry Association (PCMCIA) card manufacturers and graphics controller manufacturers to provide a central processing unit (CPU) independent path to a graphics controller for digital video information. It is a bit parallel (YUV encoded) serial data interface (i.e., the pixels arrive serially for each line). Vertical, horizontal sync as well as dotclock is provided. PCI bus 108 is a 32 (expandable to 64)-bit high speed parallel databus standard. The bus operates currently at 33 Mhz so as to provide up to 132 Mbytes/second data transfer rate. Future implementations will increase the bus speed. This bus is described in detail in the "PCI Specification, version 2.1" published by the PCI Special Interest Group. Chipset 104 receives the IEEE 1394 serial data stream (at up to 400 Mbits/second) and converts the data into parallel data suitable for sending over the PCI and/or Zoom Video data busses. The data that goes out on Zoom Video bus 106 is arranged to fit the YUV encoding format with vertical and horizontal syncs. Chipset 104 can also operate as a PCI Bus Master, thus can burst image data to anywhere in the CPU's main memory or to any PCI slave device's memory.

It should again be pointed out that Zoom Video bus 106 and PCI bus 108 are exemplary digital buses. The present invention could be implemented using other high bandwidth buses.

The output of chipset 104 is coupled to an image processor (IP) 110. The Zoom Video bus allows IP 110 to receive video data in parallel with a CPU system, shown in FIG. 2 as reference numeral 114. IP 110 could perform many tasks, from complex to simple. At the complex end, IP 110 may be responsible for processing video on a frame by frame basis to extract data from, or to enhance the image. An example is the V-LACE™ real time image enhancement algorithm from DigiVision. At the simple end, IP 110 may be asked to shut down and passively pass the image data through to a 3D Graphics accelerator 116. Other examples may involve feature extraction from the image, classification of those features and alerting the main CPU of those results.

IP 110 could be implemented as a DSP like subsystem with its own memory, CPU and I/O capability. A high performance parallel execution unit CPU like the TMS320C80 is preferably used to execute algorithms which may employ fast Fourier Transform (FFT) like calculations. An example of IP 110 is Ariel Corp's TMS320C80 based Griffin PCI bus image processing board.

Zoom Video is preferably used to pass the image data in real time to IP 110 and deliver the results to 3D graphics processor 116. PCI bus 108 provides an alternate path for the result or input data. Main CPU system 114 may utilize IP 110 as a parallel processor (to itself), pre-processor, or post-processor of image information.

3D graphics processor 116 is used to off load time-consuming graphics operations from the CPU. Although all functions could be implemented in the main CPU, that would consume a substantial amount of the power of present generation of CPUs, leaving little power for other tasks. Graphics processor 116 receives image information from Zoom Video bus 106. It contains a PCI interface, which provides a high bandwidth bus to the CPU for image rendering primitives, background information, text etc. Graphics processor 116 provides near real time rendering of the augmentation objects using dedicated hardware specifically designed for 3D graphics operations.

Alternately, it is possible for video data to flow at full speed, about 27 Mbytes per second, from the FireWire interface over the PCI bus and directly to the memory of graphic processor 116.

The image generated by graphics processor 116 is sent to a display 118. It converts RGB encoded digital data into light.

The preferred display is small size, low power consumption, and high resolution. Examples of suitable displays are active matrix color liquid crystal display (LCD), LCD projection panel, digital micromirror device (DMD), and vacuum fluorescent display (VFD).

CPU system 114 could be a single CPU. Alternatively, it could be a multiprocessing system. Examples are MIPS 10000, DEC ALPHA, SUN Ultra SPARC. The preferred system is a Pentium Pro single or multiprocessor system (this choice is based on costs and availability of development tools).

The preferred CPU system typically requires a core logic chipset (shown in FIG. 2 as reference numeral 120). It provides the interface between CPU system 114, a main memory 122, and PCI data bus 108. Examples of chipsets are Intel's Orion Core Logic chipset, 440FX, 450GX, and 450KX. The Orion chipset provides multi-processing support for up to four processors. A PCI bus and an Industry Standard Architecture (ISA) bus (shown as reference numeral 126) are supported. The preferred CPU system also requires random access memory (RAM) 122 to provide storage for program execution.

It should be noted that the use of 3D graphics processor 116 is optional. Some microprocessors contain multimedia instructions which allow multimedia tasks to be easily performed. Examples of such microprocessors are Intel's Pentium-MMX (code named the P55C) and Sun's UltraSPARC. It should also be pointed out that graphics processors could be used in combination with this kind of microprocessors (i.e., having instructions designed to execute multimedia instructions) in order to obtain enhanced performance.

System 100 comprises a mass storage unit 130, which is coupled to PCI bus 108 by a hard disk interface 131. Examples of interface 131 are an Enhanced Integrated Drive Electronics (EIDE) interface and a Small Computer System Interface (SCSI). Unit 130 provides storage space for Geographic Information Systems (GIS) database information, algorithm and program information for IP 110, and operating system software for main CPU system 114. System 100 contains software (which could be stored in mass storage unit 130 and loaded into RAM 122 or burnt into read-only memory) for searching and retrieving data from the GIS database. The searching preferably uses position, attitude, and other data for identifying the location and point of view of camera 102.

Although there are mass storage units having several gigabytes of storage, their physical sizes are too large for the present embodiment. The preferred mass storage unit 130 is a balance between size, weight, cost and performance. At the present time, a rotating magnetic medium storage using 1.2 gigabyte 2.5" technology is considered the preferred storage unit.

System 100 also comprises a real time clock (RTC) 134. It provides local timekeeping and (optionally) non-volatile storage of system parameters during power off conditions. The design of RTC 134 depends on the requirements of CPU system 114 and core chipset 120. Many companies, such as Dallas Semiconductors, Inc., Benchmarq Semiconductors, and Chips & Technologies, Inc. manufacture RTCs for various CPU system architectures.

The connection to various peripheral devices is now described. Serial ports (shown as numerals 136, 137 and 160), such as RS232, NMEA-183, and RS422, could be used to provide the connection. The serial ports provide serial to parallel conversion, which converts asynchronously formatted data (received from the peripheral devices) to parallel data. The data is sent over ISA bus 126 to CPU system 114 for processing. It should be noted that the present invention is not limited to using asynchronous serial ports as means for interfacing with peripheral devices. For example, parallel ports or synchronous serial ports could also be used.

An example of a peripheral device that can be connected to serial ports 137 is a Global Positioning System (GPS) 140. It derives 3-dimensional position information from a GPS satellite navigation system (not shown). Typically, the 3-dimensional position information is derived by a "GPS Core" module which measures transit times of the L-band signals broadcast by the twenty four satellites of the GPS constellation. In the present embodiment, GPS 140 is interfaced via one of the serial ports using NMEA 183 format data. As an alternative, a proprietary format may be used from one of the many GPS core module makers (e.g., Motorola, Garmin, Trimble, Furuno, Ashtech, Rockwell, Plessy, Canadian Marconi, etc.).

If it is desirable to improve the accuracy of GPS 140, a differential GPS (DGPS) 141 could be used. It provides correction information to GPS receiver 140 in order to increase the accuracy and remove the effects of selective availability. DGPS is developed by a precisely surveyed reference GPS receiver base station. Correction data derived for each satellite is formatted in RCTM-104 format and broadcast via a communications system to the user. These corrections are applied to each of the measurements made in the users GPS receiver so as to produce a more accurate result. DGPS 141 it is interfaced to the GPS receiver via a serial interface supporting RCTM-104 format data.

Alternatively, devices that can receive GPS and/or Glonass (Global Navigational Satellite System) signals can be connected to serial port 137. An example of a device that can receive both GPS and Glonass signals is GG24 developed by Ashtech Inc. A further alternative embodiment is to use real time kinematic surveying techniques. These techniques are able to achieve higher accuracy than DGPS.

Another peripheral device that may be used in electro-optic system 100 is a spread spectrum (SS) radio 144. It provides wireless communication between peer units or between master and slave units. Major advantages of SS are spectrum re-use, simultaneous existence of multiple networks, data security and low probability of intercept. An example of a SS radio is Proxim RangeLan 2, which operates at 2.4 GHz and has a data rate of 1.6 Mbits per second.

An accelerometer 148 can also be coupled to one of the serial ports. In one embodiment of accelerometer 148, an integrated circuit (e.g., Analog Devices' ADXL05) is used to generate an analog voltage which is proportional to the instantaneous acceleration along a specified axis. The analog voltage can be converted to a digital value (by an analog-to-digital converter) and then serialized so as to be compatible with a chosen serial port communication protocol. The acceleration information could be used in image stabilization efforts and in augmenting the information from the GPS and tri-axial magnetometers.

A tri-axial magnetometer, such as a TCM-2 module from Precision Navigation Inc., can also be connected to one of the serial ports. Such a device provides attitude information, in all three degrees of freedom, regarding the pointing direction of the optical axis of the camera.

In FIG. 2, a laser range finder 162 is connected to serial port 160. An example of a range finder is Leica's Data Disto RS232.

System 100 also allows various user interface devices 154 to be connected to ISA bus 126. These interface devices include devices that can accept input signal and generate output signals. Examples of user interface devices are control buttons, switches, optical indicators (e.g., LEDs) and alarms.

In the present specification, four exemplary applications of system 100 are described. The first application is an electronic binoculars having a "text box" superimposed on a real image. The text box contains text data related to the real image. The second application is "0-0" visibility navigation system which can help a user to navigate a movable object (e.g., ships, planes, and vehicles) under adverse visual environment. The third application is an object identification system which attempts to identify an object under adverse viewing conditions. The fourth application is an advanced image augmentation application which can process, enhance, and augment images.

Electronic Binocular

Camera 102 is used to capture a view and delivers a corresponding video data to FireWire chipset 104. The data flows to IP 110. In this application, IP 110 is configured as a pass-through device and just passes the data, without processing, on to graphics processor 116. CPU system 114 is not used to process the image data, so none flows over PCI bus 108. CPU system 114 sends text data to graphics processor 116 which renders it at points in the image that correspond to the attitude and location "text boxes." Location data is read from GPS 140 and if appropriate, DGPS 141, via serial port 137. Attitude information is read from tri-axial magnetometer 150 via serial port interface 136. GIS data is retrieved from the database on storage system unit 130.

In one embodiment, CPU system 114 sets the optical and electronic zoom factors in camera 102. Zoom factors are read back along with exposure and iris information from the camera via the FireWire. Information on zoom factors is used by CPU system 114 to properly generate augmentation images.

"0-0" Visibility Navigation

Camera 102 is used to capture a view and deliver a corresponding video data to FireWire chipset 104. The data flows to IP 110, which attempts to extract features from the data using a plurality of frames. Location data is read from GPS 140 and if appropriate, DGPS 141, via serial port 137. Attitude information is read from tri-axial magnetometer 150 via serial port interface 136. CPU system 114 retrieves GIS data from storage unit 130 relative to the current position. It then sends "wire frame" graphics to graphics processor 116, which renders and textures those wire frames into realistic looking images of what "should" be in the field of view of the system.

Vessel Identification

Camera 102 is used to capture a view and delivers a corresponding video data to FireWire chipset 104. The data flows to IP 110. CPU system 114 has previously retrieved (at the user's request) several 3D models of ships that are due to pass by. The 3D models of ships are retrieved from storage unit 130. This information is sent to IP 110 via PCI bus 108. IP 110 searches the field of view (obtained from camera 102) for objects. Upon identifying an object, it is compared with various aspects of the 3D models. Upon finding a "match," information is sent to CPU system 114, which sends a signal to alert the user.

Advanced Image Augmentation

Camera 102 is used to capture a view and deliver a corresponding video data to FireWire chipset 104. The data flows to IP 110, which enhances the image and attempts to extract features from the data using a plurality of frames. CPU system 114 has previously loaded IP 110 with the appropriate algorithm and program information. The enhanced image flows to graphics processor 116 (via Zoom Video 106) and the features to CPU system 114 (via PCI bus 108). Meanwhile the image data also flows to CPU system 114 (via PCI bus 108) which uses the feature locations to identify objects in the image and create a "mask" to be used by graphics processor 116 to "remove" those features from the final view. CPU system 114 sends the "masks" to graphics processor 116 along with text and drawing primitives. Graphics processor 116 renders the text, removes the "masked" objects, and renders non-existent objects as directed by CPU system 114.

Location data is read from GPS 140 and if appropriate, DGPS 141, via serial port 137. Attitude information is read from tri-axial magnetometer 150 via serial port interface 136. CPU system 114 retrieves GIS data relative to the current position from storage unit 130.

In this application, camera 102 is configured to achieve a desired stabilization factors. Graphics processor 116 is configured to display image data (received from Zoom Video bus 106) while applying the "mask", text and graphics as overlays. Zoom factors are read back along with exposure and iris information from camera 104 via FireWire chipset 104.

The invention now being fully described, it will be apparent to one of ordinary skill in the art that any changes and modifications can be made thereto without departing from the spirit or scope of the invention as set forth herein. It should be noted that computing technology is constantly being developed. New developments can be appropriately used to improve the system disclosed herein. For example, a new peripheral bus called the Universal Serial Bus (USB) may be advantageously used to connect a large number of peripherals to the system of the present invention. Similarly, various solid state memory devices such as synchronous DRAM, EDRAM, etc. can also be used. Cache memory can be attached to the present system to improve the performance. Accordingly, the present invention is to be limited solely by the scope of the appended claims.

The invention claimed is:

1. An image processing system comprising:
   a real time position device identifying a geographical position of at least a portion of the image processing system, wherein the geographical position identifies information that enhances real scene image information at the geographical position;
   a graphic processor for processing and combining the information that enhances the real scene image information with the real scene image information to produce an augmented real scene image for viewing; and
   a display for showing the augmented real scene image that is produced in visual proximity of the geographical position identified by the real time position device.

2. The system of claim 1, wherein the real time position device includes a global positioning device.

3. The system of claim 2, wherein the real time position device includes a Global Positioning System device.

4. The system of claim 2, wherein the real time position device includes a differential Global Positioning System device.

5. The system of claim 2, wherein the real time position device includes a Global Navigational Satellite System device.

6. The system of claim 1 further comprising a database for storing the information that enhances real scene image information.

7. The system of claim 6 wherein the information stored in the database is identified by geographical position.

8. the system of claim 1 further comprising an attitude device identifying an attitude of said portion of the image processing system.

9. The system of claim 8 further comprising a database for storing information that enhances real scene image information.

10. The system of claim 9 wherein the information that is stored in the database is identified by geographical position and attitude.

11. An image processing system comprising:
an attitude device identifying an attitude of at least a portion of the image processing system, wherein the attitude identifies information that enhances real scene image information at the device;
a graphic processor for processing and combining the information that enhances real scene image information with the real scene image information to produce an augmented real scene image for viewing; and
a display showing the augmented real scene image that is produced in visual proximity of the attitude device.

12. The system of claim 11, wherein the attitude device includes a magnetometer.

13. The system of claim 11 further comprising a database for storing the information that enhances real scene image information.

14. The system of claim 13 wherein the information stored in the database is identified by attitude.

15. The system of claim 11 further comprising a real time position device for identifying a geographical position of said portion of the image processing system.

16. The system of claim 15 further comprising a database for storing information that enhances real scene image information.

17. The system of claim 16 wherein the information stored in the database is identified by geographical position and attitude.

18. An image processing system comprising:
a real time position device identifying a geographical position of at least a portion of the image processing system, wherein the geographical position identifies information that enhances real scene image information at the geographical position;
an attitude device identifying an attitude of at least a portion of the image processing system, wherein the attitude identifies information that enhances real scene image information at the device;
a database for storing information identified by geographical position and attitude that enhances real scene information at the geographical position;
a graphic processor for processing and combining the information retrieved from the database that enhances the real scene image information with the real scene image information to produce an augmented real scene image for viewing; and
a display for showing the augmented real scene image that is produced in visual proximity of the geographical position identified by the real time position device.

* * * * *